Jan. 21, 1964 G. N. BLISS ETAL 3,118,548
EGG END ALIGNER

Filed March 7, 1962 4 Sheets-Sheet 1

INVENTORS
GEORGE N. BLISS &
GEORGE A. PAGE

BY Colway, Ward & Kraus

ATTORNEYS

INVENTORS
GEORGE N. BLISS &
GEORGE A. PAGE

BY Calwen, Naid & Kraus

ATTORNEYS

Jan. 21, 1964    G. N. BLISS ETAL    3,118,548
EGG END ALIGNER
Filed March 7, 1962    4 Sheets-Sheet 3

INVENTORS
GEORGE N. BLISS &
GEORGE A. PAGE
BY
Calman, Nord & Krass
ATTORNEYS

Jan. 21, 1964 G. N. BLISS ETAL 3,118,548
EGG END ALIGNER
Filed March 7, 1962 4 Sheets-Sheet 4
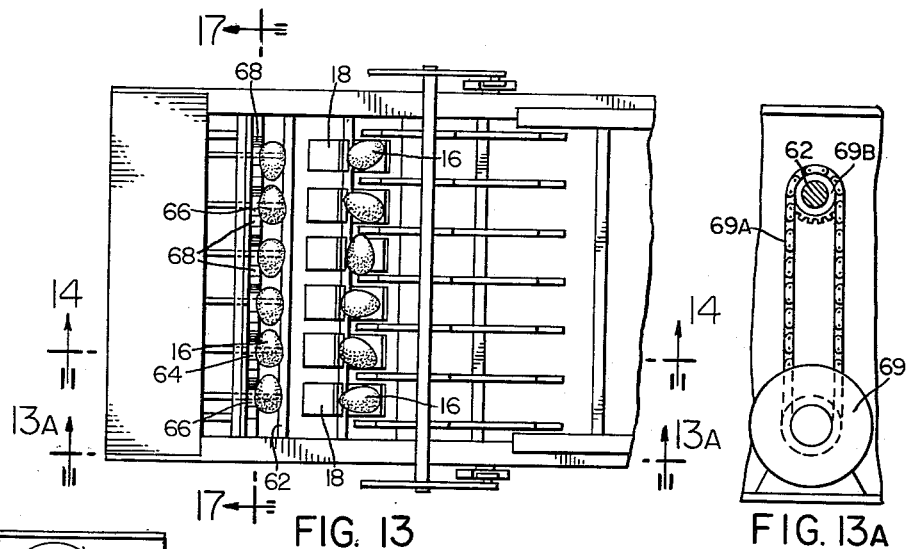
FIG. 13
FIG. 13A
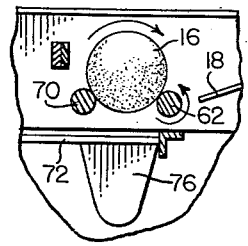
FIG. 16
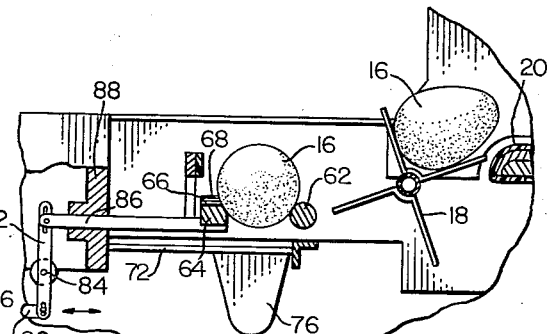
FIG. 14
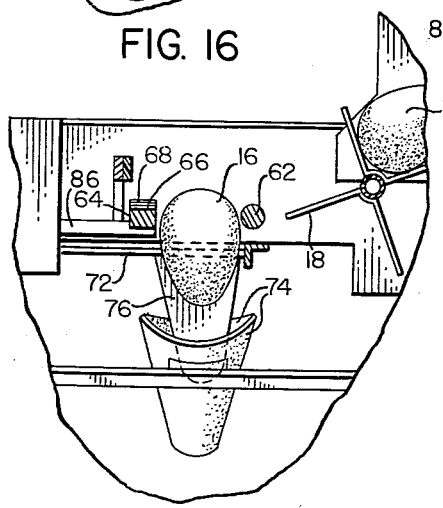
FIG. 15
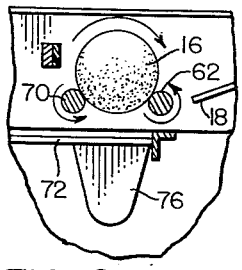
FIG. 16A
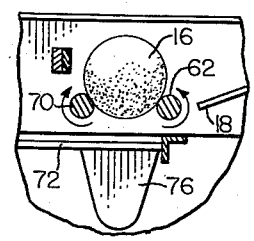
FIG. 16B
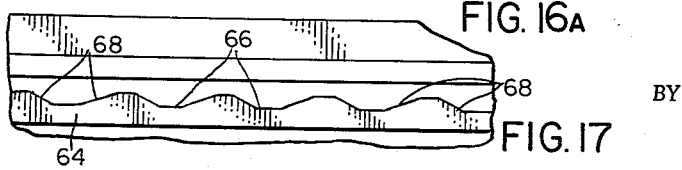
FIG. 17
INVENTORS
GEORGE N. BLISS &
GEORGE A. PAGE
BY
Colman, Nord & Krass
ATTORNEYS

United States Patent Office 3,118,548
Patented Jan. 21, 1964

3,118,548
EGG END ALIGNER
George N. Bliss, Birmingham, and George A. Page, Detroit, Mich., assignors to Page-Detroit, Inc., Redford, Mich., a corporation of Michigan
Filed Mar. 7, 1962, Ser. No. 178,160
19 Claims. (Cl. 214—1)

This invention relates to an egg end aligner and more particularly to mechanism that aligns eggs with their points directed downwardly for discharge into receiving containers.

The invention involves a structure that rotates eggs into position for dropping them point down into receiving containers. The means by which this is accomplished forms the subject matter of this application. The structure comprises basically a pair of parallel bars spaced apart from each other to cradle an egg thereon and therebetween together with a juxtaposed transverse bar, so that upon separation of the two parallel bars the egg drops against the transverse bar and tilts downwardly upon its point. The egg, being an oblate spheroid, has a transverse axis of maximum diameter substantially to one end of the mass, the end portions being somewhat disproportionate in mass and weight. The longitudinal axis of the egg is generally disposed, when the egg is at rest on a horizontal plane, at an angle to the horizontal plane so that the egg tends to roll as a cone and will tilt or pivot in the direction of its point. The transverse bar is disposed slightly below and adjacent the two parallel egg supporting bars whereby when the egg is lowered by the separation of the two bars it engages the transverse bar in an off-balance position. The pointed end of the egg is offset forwardly with respect to the transverse bar and pivots upon the transverse bar in a point-down direction. To assist in maintaining this directional movement, a swing plate is suspended from the transverse bar in a free-swinging relationship and serves as a back stop for the pivoting egg as it drops from the parallel bars and tips over and across the transverse bar to chutes serving as intermediate discharge mechanism. The egg may be offset to the one or the other side of the transverse bar and drops point down against the swing plate in the chutes or clam shells. Discharge mechanism provided in the structure receives the eggs in the end aligned position and deposits them into receiving containers.

It is an object of the invention to provide a structure for end aligning eggs deposited thereon. Another object is to provide in this structure a pair of separable bars which initially carry the eggs thereon and which provide support for the eggs as the bars separate. A further object is to provide means for rotating at least one of the bars so as to cause the egg carried thereon to rotate and advance along the bars. A further object is to provide parallel bars, at least one of which is rotatable to frictionally engage the egg and to advance it in the direction of its point to a position off-center and off-balance with respect to a third bar positioned transversely below the two parallel bars. A primary object is to provide the transverse bar under the two parallel bars and in adjacent relationship thereto so that as the egg drops from the parallel bars thereonto the egg positively pivots to a point-down direction. Yet another object is to provide means for receiving the end aligned eggs point down and discharging them into receiving containers.

These and additional objects of the invention and features of construction will become more clearly apparent from the description given below, in which the terms employed are used for purposes of description only and not of limitation.

Reference is here made to the several views in the drawings accompanying this specification and made an integral part thereof, and in which FIGURE 1 is a perspective view of the egg end aligning structure of this invention.

FIGURE 13 is a top plan view of a modified egg end aligning structure, in which only two bars are used for a series of eggs.

FIGURE 13A is a fragmentary elevational view taken substantially on the line 13A—13A in FIGURE 13.

FIGURE 14 is a longitudinal vertical sectional view taken substantially on the line 14—14 of FIGURE 13.

FIGURE 15 is a longitudinal vertical sectional view similar to that shown in FIGURE 14, further showing an egg dropping into the clam shells therebelow as the parallel bars separate.

FIGURES 16, 16A and 16B are vertical sectional views similar to that shown in FIGURE 14, in which rotating bars are used, the direction of rotation of one or both bars being shown by the arrows adjacent the bars.

FIGURE 17 is a fragmentary side elevational view taken substantially on the line 17—17 of FIGURE 13, and illustrating the configuration of the non-rotating multiple egg aligning bar.

Figure 1:
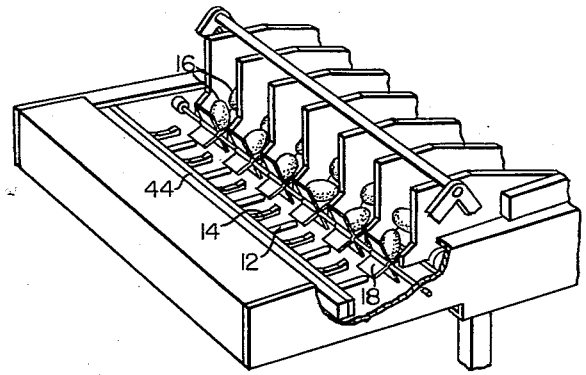
Figure 2:
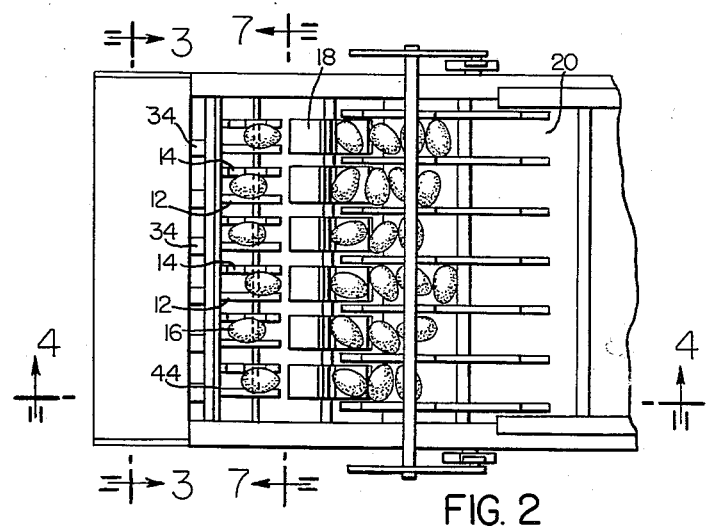
FIGURE 2 is a top plan view of the structure shown in FIGURE 1.
Figure 3:
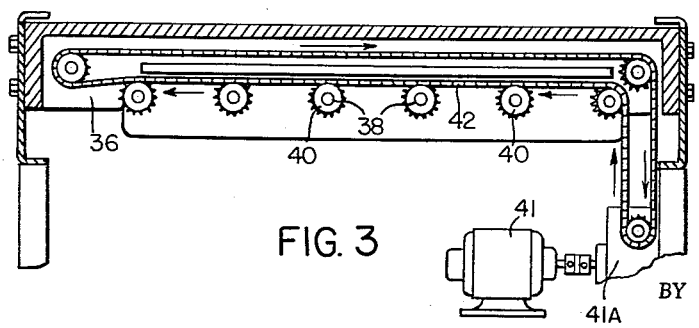
FIGURE 3 is a transverse vertical sectional view taken substantially on the line 3—3 of FIGURE 2.

As shown in the several views of the drawings and particularly in FIGURES 1 to 12 inclusive, the egg end aligning structure 10 comprises a first aligning bar 12, a second aligning bar 14 spaced in parallel relationship to receive an egg 16 discharged by a paddle wheel 18 from a carrier 20, and a transverse bar 26 positioned below and transversely of the axes of the bars 12 and 14. In FIGURES 1, 2, 3, 7 and 8 a multiple arrangement of the structure 10 is shown. This arrangement is designed for a row of six eggs 16 to be discharged into a receiving container 22. However, any suitable number of the structures 10 can be arranged in multiple to suit the needs of packaging the eggs.

Figure 11:
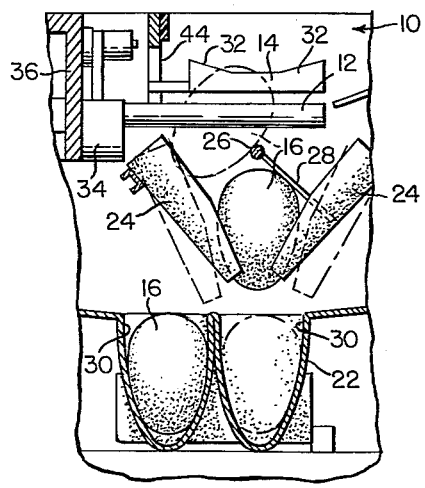
Figure 12:
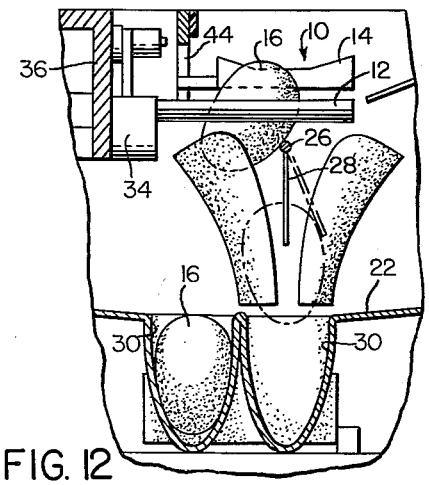
FIGURE 12 is a vertical view similar to FIGURES 10 and 11 showing fixed clam shells serving as chutes for the egg.

Basically, the egg end aligning structure 10 comprises the parallel aligning bars 12 and 14 which separate and move apart relative to one another so that the egg 16 disposed thereon drops against transverse bar 26 and into trough members or clam shell chutes 24, 24 for discharge into the container 22. As shown more clearly in FIGURES 4, 6, 9, 10 and 11, the egg 16 which has been discharged onto bars 12 and 14 by the paddle wheel 18 is disposed therebetween and comes to rest with its point directed forwardly, i.e. to the left, or rearwardly, to the right, on the two parallel bars. Bar 14 is preferably arranged as non-rotating. Bar 12 is rotated to advance the egg by frictional engagement toward one end or the other of the engaging and supporting edges of the two bars. Since an egg rolls and advances in the direction of its point, rotation of bar 12 moves the egg toward one or the other end of the two parallel bars. By positioning the paddle wheel 18 with respect to the bars 12 and 14 so that the egg 16 would be discharged thereonto in a consistently forward or rearward pointed direction, it would not be necessary to rotate bar 12, for then the eggs would always be in proper position for discharge. However, since the eggs come onto the paddle wheels in every conceivable orientation, they are discharged onto the bars 12 and 14 in either direction. Disposed under, adjacent, transversely to and substantially medially of the two parallel bars 12 and 14 is the pivoting bar 26 supporting a freely swinging plate 28. The transverse bar 26 is positioned slightly under and substantially medially of the parallel bars and intermediate the clam shells 24, 24. The function of the transverse bar 26 is to cause the egg to positively tilt and pivot thereon to the point-down end of the egg, the swing plate 28 serving to prevent rotation of the egg from its point-down disposition as it leaves the bar 26 and strikes or slides against one or the other of the clam shell chutes 24, 24. The eggs 16 drop against the bar 26, being off-balance with respect to that bar, to the side toward which the point of the egg is directed, tilting and sliding downwardly against the clam shell 24 on that side and then against the complementary clam shell to be caught therebetween (FIGURE 11). As shown in FIGURE 11, the clam shells 24, 24 pivot and swing apart (broken lines) to release the egg 16 which drops into one of the recesses 30 in the container 22.

Figure 8A:
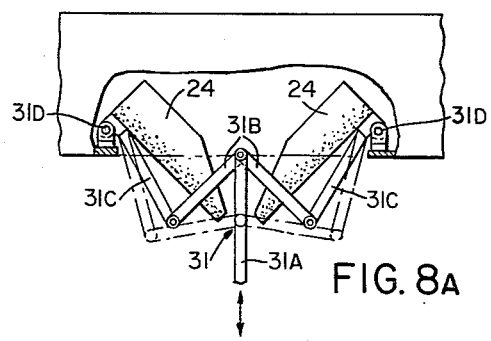
FIGURE 8A is a fragmentary horizontal transverse view principally in elevation taken substantially on the line 8A—8A in FIGURE 8, and illustrating mechanism for swinging or pivoting the clam shells toward and away from each other.

As shown particularly in FIGURE 8A, the clam shells 24, 24 are operated by a lever mechanism 31 comprising linked levers 31a, 31b, and 31c, the latter being fixed to the clam shell structure 24 which pivots on pin 31d. As the lever 31a moves upwardly the clam shells 24, 24 close toward each other so as to hold an egg 16 discharged thereinto, as lever 31a moves downwardly the clam shells swing apart releasing the egg to the container recess 30 therebelow.

In the multiple arrangement shown in FIGURES 1, 2, 3, 7 and 8, the structures 10 are multiplied by six. The bars 14 are each arranged with spaced ramps 32 inclined upwardly away from each other at the ends of an elongated midsection along which the egg travels as bar 12 rotates and drives the egg toward one ramp or the other, depending upon which way the egg is pointed. The ramps 32 serve as stops to prevent overtravel of the egg and to place it in a position where it is off-balance with respect to the transverse bar 26. The bars 12 in the multiple arrangement may be rotated simultaneously and in unison in one direction or the other, but the preferred direction is counterclockwise so that the eggs are urged toward the complementary bars 14, as indicated by the arrows in FIGURES 3, 7 and 8. The bars 12 are each rotatably supported in bracket members 34 which are secured to a frame member 36, the bars having hub end portions 38 projecting through the members 34 and 36 outwardly thereof to mount drive gears 40 driven by a motor 41, a speed reducer 41a and a chain drive 42. The bars 14 are fixedly secured to a support member 44 pivotally mounted on levers 46, which upon actuation swing the support member 44 upwardly to the right (as in FIGURES 7 and 8), releasing the eggs 16 from between the bars 12 and 14 so as to drop them into the clam shells 24, 24. A modified structure for the clam shells is that shown in FIGURE 12 in which the clam shell chutes 46, 46 are fixedly secured and the egg 16 slides along one or the other of them into the pocket 30 of the receiving container 22.

Figure 4:
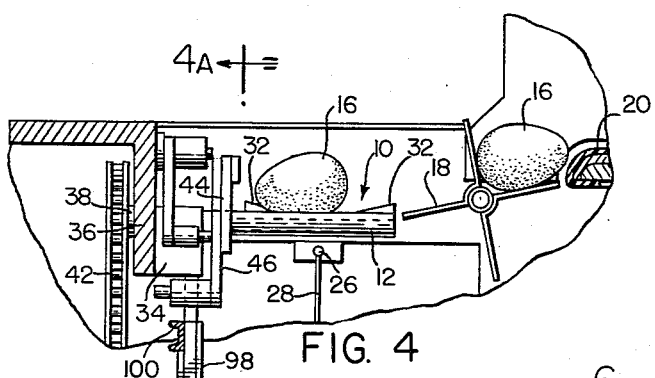
FIGURE 4 is a longitudinal vertical sectional view taken substantially on the line 4—4 of FIGURE 2.
Figure 4A:
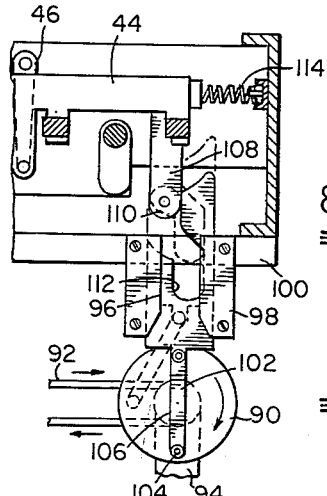
FIGURE 4A is a horizontal transverse view principally in elevation taken substantially on the line 4A—4A in FIGURE 4, and illustrating mechanism for opening and closing the egg aligning members.
Figure 8:
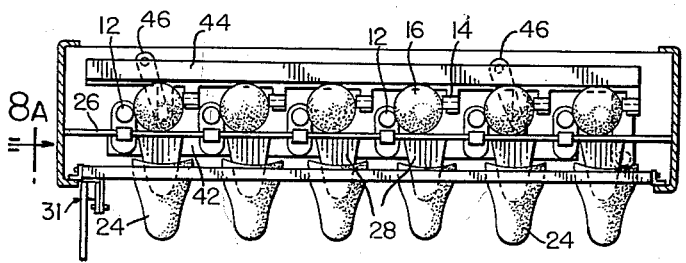
FIGURE 8 is a view similar to FIGURE 7 but showing the parallel bars supporting each of the eggs separating to a position where the eggs are ready to pivot point-downwardly.
Figure 9:
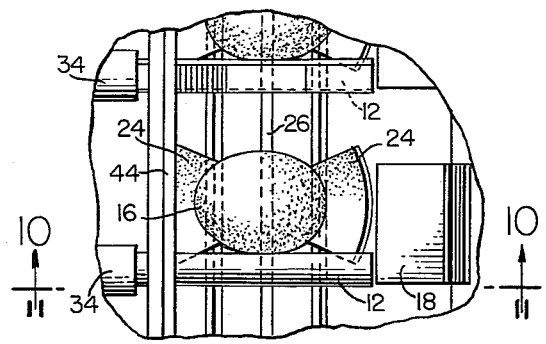
FIGURE 9 is an enlarged top plan view of the egg end aligning structure with an egg ready to drop into the clam shells for discharge into a receiving container.
Figure 10:
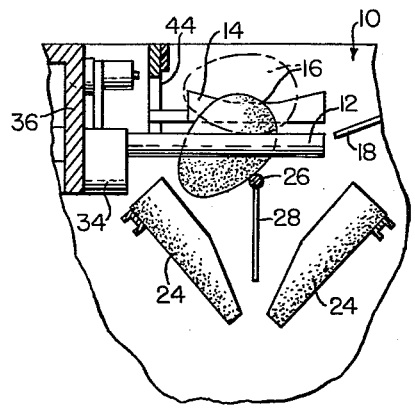
FIGURES 10 and 11 are vertical views showing positions of vertical travel of the egg in its discharge into the receiving container.

As shown in FIGURES 4 and 4A, mechanism for moving the bars 12 and 14 further apart and toward each other comprises a drive wheel 90 driven by a belt or chain 92 and rotatably mounted on a support 94, a cam 96 slidable in a guide 98 mounted upon framing 100 and actuated by a pivoted lever 102 having a pin 104 engaged by the wheel 90 in slot 106. The support member 44 is provided with a depending lever 108 fixedly secured to the member 44 and adjacent one of its ends. Lever 108 is provided with a roller 110 extending laterally from the lever so as to engage cam 96 in cam slot 112 as it moves upwardly and downwardly upon rotation of drive wheel 90. To assist in maintaining support member 44 in engagement with the cam 96 and toward an egg-supporting position, a compression spring 114 is disposed between the outer framing and the member 44.

Whereas in FIGURES 1 through 12, the inventive egg end aligning structure 10 is shown as a unitary embodiment for individual eggs and as a conjoined series of parallel structures in multiple arrangement, the inventive concept can also take the form of a single pair of parallel bars for more than one egg 16. This modification and embodiment is shown in FIGURES 13 through 17 inclusive.

The egg end aligning structure 60 (FIGURES 13–17) comprises two parallel aligning bars 62 and 64. In FIGURES 13, 14 and 15, the aligning bars 62 and 64 are arranged with bar 62 rotating and frictionally engaging egg 16, causing it to rotate and bear against the bar 64 at the flat portion 66 intermediate its inclined ramps 68, 68. The side elevational view in FIGURE 17 illustrates the vertical configuration of the egg aligning bar 64. Drive means for rotating the bar 62 comprises a motor drive 69 and drive chain 69a engaging gear 69b mounted on rotatable bar 62, such drive means taking the form of a chain drive and gear similar to that shown in FIGURE 3 or some equivalent drive system.

Linkage means to move the bar 64 from and into egg supporting position comprises the lever 80 pivotally connected to one end of a rotatable lever 82 pivoted at 84, and a lever arm 86 conjoined to aligning bar 64 and slidable through a bearing 88. The rotatable lever 82 is provided with slotted openings adjacent its ends to receive the pivot pins that link such lever to the operating levers 80 and 86 and permit the pivot pins to slide along such openings as they move the bar 64.

An alternative modification for the bar 64 is that shown in FIGURES 16, 16A and 16B, wherein the stationary bar of rectilinear cross-section is replaced with a round bar 70. Bar 70 is also caused to rotate, by suitable drive means in one of the directions shown in FIGURES 16A and 16B. Upon further separating the bars 62 and 64 as in FIGURE 15, or the bars 62 and 70, the eggs 16 drop and tilt against and past the transverse bars 72 toward the clam shell chutes 74, the swing plate 76 assisting in maintaining the downwardly pointed eggs from rotating upwardly as they pass into the area of the clam shells 74, 74.

In the structure illustrated in FIGURE 16B, the rotating bars 62 and 70 may be covered with materials having different coefficients of friction. The eggs 16 will then slide or slip upon the bar of a lower coefficient of friction and advance along the two parallel bars. Rubber or rubber-like materials with a relatively high coefficient of friction can be used on the rotating bars, while nylon and similar materials can be employed on the non-rotating bars.

The modification above described for rotating both egg end aligning bars 62 and 70 is also applicable to the embodiment shown in FIGURES 1, 2 and 4–12 inclusive described earlier in this specification.

It is well understood by persons skilled in the egg handling industry that the best and preferred way to pack eggs is in a point-down disposition. It has been a problem in the industry to find a way to automatically orient eggs carried by a conveyor in random arrangement to assume a point-down disposition as they are being charged into receiving cartons. Experimental testing and field testing have established the end aligning structure heredisclosed to be a most efficient and satisfactory structural solution to the problem.

Figure 5:
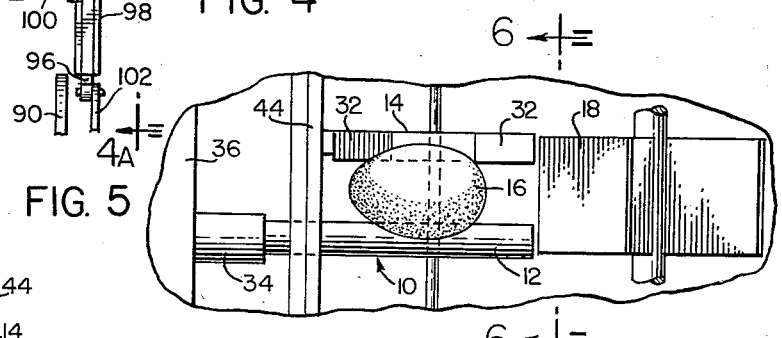
FIGURE 5 is an enlarged top plan view of the egg end aligning mechanism.
Figure 6:
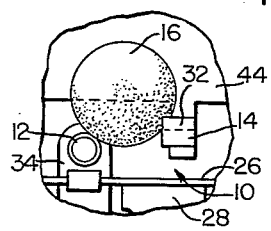
FIGURE 6 is a transverse vertical view of the mechanism taken substantially on the line 6—6 of FIGURE 5.
Figure 7:
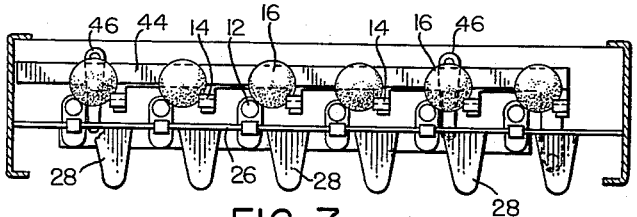
FIGURE 7 is a transverse vertical view of a battery of egg end aligning mechanisms conjoined to operate simultaneously, taken substantially on the line 7—7 of FIGURE 2.

In operation, the invention works in the following manner. A carrier 20 translates eggs 16 in random arrangement to paddle wheels 18, or other device, which discharges them onto the bars 12 and 14. An egg 16 rests upon these bars substantially as shown in FIGURES 4, 5 and 6. Its point may be in any direction. Bar 12 is caused to rotate by the chain drive 42 and frictionally engages the egg 16 which aligns itself with the bars and rotates and moves in the direction of its point toward one or the other of the bar ramps 32 where it comes to a pause or stop in its forward travel. The rotational engagement of the bar 12 is insufficient to force the egg up the ramp 32, and it is then in proper position for dropping toward the clam shells 24, 24 on one or the other side of the transverse bar 26, being off-center with respect thereto. The lever member 44, fixedly supporting the bars 14, is caused to swing by suitable means in a direction such that the bars 12 and 14 are further separated, and as they do the eggs 16 drop downwardly until they meet the transverse bars 26 upon which they tilt and fall against one of the clam shells 24 and are caught between them. The clam shells 24, 24 are then caused to open and the eggs to drop into the recesses 30 of the receiving containers 22. The same operation obtains for the structure 60 described above and shown in FIGURES 13, 14 and 15.

To safeguard the fragile eggs 16 during this aligning operation, it is preferred to cover the bars and other elements, making physical contact with the eggs, with materials such as plastic, rubber, vinyl, nylon, fiber or other similar materials to provide suitable means for frictional engagement with the eggs and to reduce the incidence of cracking or fracture of the egg shells.

The invention, as above described, involves a structure having two parallel spaced bars supporting an egg, one or both of these bars being rotatable to align the egg upon the bar, then further separating the bars so as to allow the egg to engage and tilt upon a transverse bar below the two parallel bars and tilt or pivot into a point-down disposition to a receiving device or to a receiving container. The paddle wheel and carrier structure are auxiliary to the inventive end aligning structure, as are the clam shells or other egg receiving devices or containers. In a production set-up requiring equipment to handle hundreds and thousands of eggs a day, the auxiliary equipment hereindisclosed and referred to are desirable elements of the system which embodies the inventive egg end aligning structure.

Having described the invention in its simplest terms, it is to be understood that the features of construction may be changed and varied in greater or lesser degree without departing from the essence of the invention defined in the appended claims.

We claim:

1. In a device for end aligning eggs in a point-down disposition,
   end aligning mechanism having
      two parallel spaced apart bars adapted to receive and support an egg thereon and therebetween,
         at least one of said bars being rotatable and in frictional engagement with said egg to rotate and to advance said egg substantially in the direction of its point upon said parallel bars,
      means to rotate at least said one bar,
      means to further separate said parallel bars so as to allow said egg to fall therebetween,
      and means disposed transversely of said two parallel bars below and adjacent said parallel bars for pivoting said egg into a point-down disposition as it falls from between said parallel bars,
      said egg being discharged from between said parallel bars offset toward its pointed end upon said means disposed below said parallel bars.

2. In a device for end aligning eggs in a point-down dispostion,
   end aligning mechanism having
      two parallel spaced apart bars adapted to receive and support an egg thereon and therebtween,
         at least one of said bars being rotatable and in frictional engagement with said egg to rotate and to advance said egg substantially in the direction of its point upon said parallel bars,
      means to rotate at least said one bar,
      means associately conjoined to and adapted to further separate said bars so as to allow said egg to fall therebetween,
      and means disposed below and adjacent said parallel bars for pivoting said egg into a point-down disposition as it falls from between said parallel bars,
      said egg being discharged from between said parallel bars offset toward its pointed end upon said means disposed below said parallel bars.

3. In a device for end aligning eggs in a point-down disposition,
   end aligning mechanism having
      two parallel spaced apart bars adapted to receive and support an egg thereon and therebetween,
         one of said bars being rotatable and in frictional engagement with said egg to rotate and advance said egg substantially in the direction of its point upon said parallel bars,
      means to rotate said one bar,
      means associately conjoined to and adapted to further separate said parallel bars so as to allow said egg to fall therebetween,
      and means disposed below and adjacent said parallel bars for pivoting said egg into a point-down disposition as it falls from between said parallel bars,
      said egg being discharged from between said parallel bars offset toward its pointed end upon said means disposed below said parallel bars.

4. In a device for end aligning eggs in a point-down disposition,
   end aligning mechanism having
      two parallel spaced apart bars adapted to receive and support an egg thereon and therebetween,
         one of said bars being rotatable and in frictional engagement with said egg to rotate and advance said egg substantially in the direction of its point upon said parallel bars,
         the other of said bars being fixedly secured against rotation,
      means to rotate said one bar,
      means associately conjoined to and adapted to further separate said parallel bars so as to allow said egg to fall therebetween,
      and means disposed below and adjacent said parallel bars for pivoting said egg into a point-down disposition as it falls from between said parallel bars, said egg being discharged from between said parallel bars offset toward its pointed end upon said means disposed below said parallel bars.

5. In a device for end aligning eggs in a point-down disposition,
end aligning mechanism having
two parallel spaced apart bars adapted to receive and support an egg thereon and therebetween,
one of said bars being fixedly secured against rotation and having portions at each end thereof elevated above the medial portion intermediate said ends,
the other of said bars being rotatable and in frictional engagement with said egg to rotate and advance said egg substantially in the direction of its point to one or the other of said elevated bar end portions,
means to rotate said other bar,
means associatedly conjoined to and adapted to further separate said parallel bars so as to allow said egg to fall therebetween,
and means disposed below and adjacent said parallel bars for pivoting said egg into a point-down disposition as it falls from between said parallel bars,
said egg being discharged from between said parallel bars offset toward its pointed end upon said means disposed below said parallel bars.

6. In a device for end aligning eggs in a point-down disposition,
end aligning mechanism having
two parallel spaced apart bars adapted to receive and support and egg thereon and therebetween,
at least one of said bars being rotatable and in frictional engagement with said egg to rotate and to advance said egg substantially in the direction of its point upon said parallel bars,
means to rotate at least said one bar,
means associatedly conjoined to and adapted to further separate said bars so as to allow said egg to fall therebetween,
and a bar member disposed transversely below and adjacent said parallel bars for engaging and pivoting said egg into a point-down dispostion as it falls from between said parallel bars,
said egg being discharged from between said parallel bars offset toward its pointed end upon said bar member.

7. In a device for end aligning eggs in a point-down disposition,
end aligning mechanism having
two parallel spaced apart bars adapted to receive and support an egg thereon and therebetween,
one of said bars being fixedly secured against rotation and having ramps extending upwardly from a medial portion toward each end of said one bar,
the other of said bars being rotatable and in frictional engagement with said egg to rotate and advance said egg substantially in the direction of its point to one or the other of said ramps,
said ramps providing stop means against the further advance of said eggs along said bars,
means to rotate said other bar,
means associatedly conjoined to and adapted to further separate said bars so as to allow said egg to fall therebetween, and means disposed below and adjacent said parallel bars for pivoting said egg into a point-down disposition as it falls from between said parallel bars,
said egg being discharged from between said parallel bars offset toward its pointed end upon said means disposed below said parallel bars.

8. In a device for end aligning eggs in a point-down disposition,
end aligning mechanism having
two parallel spaced apart bars adapted to receive and support an egg thereon and therebetween,
one of said bars being fixedly secured against rotation and having ramps extending upwardly from a medial portion toward each end of said one bar,
the other of said bars being rotatable and in frictional engagement with said egg to rotate and advance said egg substantially in the direction of its point to one or the other of said ramps,
said ramps providing stop means against the further advance of said eggs along said bars,
means to rotate said other bar,
means associatedly conjoined to and adapted to further separate said parallel bars so as to allow said egg to fall therebetween,
and a bar member disposed transversely below and adjacent said parallel bars for engaging and pivoting said egg into a point-down disposition as it falls from between said parallel bars,
said egg being discharged from between said parallel bars offset toward its pointed end upon said bar member.

9. In a device for end aligning eggs in a point-down disposition,
end aligning mechanism having
two parallel spaced apart bars adapted to receive and support an egg thereon and therebetween,
one of said bars being fixedly secured against rotation and having ramps extending upwardly from a medial portion toward each end of said one bar,
the other of said bars being rotatable and in frictional engagement with said egg to rotate and advance said egg substantially in the direction of its point to one or the other of said ramps,
said ramps providing stop means against the further advance of said eggs along said bars,
means to rotate said other bar,
means associatedly conjoined to and adapted to further separate said parallel bars so as to allow said egg to fall therebetween,
a bar member disposed transversely below and adjacent said parallel bars for engaging and pivoting said egg into a point-down disposition as it falls from between said parallel bars,
said egg being discharged from between said parallel bars offset towards its pointed end upon said bar member,
and a swing plate suspended from said transverse bar member for engagement with said egg as it descends past said transverse bar member to maintain said egg in its point-down disposition.

10. In a device for end aligning eggs in a point-down disposition,
means for conveying and depositing an egg upon an end aligning mechanism,
said end aligning mechanism having
two parallel spaced apart bars adapted to receive and support an egg thereon and therebetween,
at least one of said bars being rotatable and in frictional engagement with said egg to rotate and to advance said egg substantially in the direction of its point upon said parallel bars, means to rotate at least said one bar,
means associately conjoined to and adapted to further separate said bars so as to allow said egg to fall therebetween,
and means disposed below and adjacent said parallel bars for pivoting said egg into a point-down disposition as it falls from between said parallel bars,
said egg being discharged from between said parallel bars offset toward its pointed end upon said means disposed below said parallel bars.

11. In a device for end aligning eggs in a point-down disposition,
end aligning mechanism having
two parallel spaced apart bars adapted to receive and support an egg thereon and therebetween,
at least one of said bars being rotatable and in frictional engagement with said egg to rotate and to advance said egg substantially in the direction of its point upon said parallel bars,
means to rotate at least said one bar,
means associately conjoined to and adapted to further separate said bars so as to allow said egg to fall therebetween,
a bar member disposed transversely below and adjacent said parallel bars for engaging and pivoting said egg into a point-down disposition as it falls from between said parallel bars,
said egg being discharged from between said parallel bars offset toward its pointed end upon said bar member,
and means to receive said point-down descending egg for discharge into a container therebelow.

12. In a device for end aligning eggs in a point-down disposition,
a plurality of end aligning mechanisms arranged in parallel, each of said end aligning mechanisms having
two parallel spaced apart bars adapted to receive and support an egg thereon and therebetween,
at least one of said bars being rotatable and in frictional engagement with said egg to rotate and to advance said egg substantially in the direction of its point upon said parallel bars,
means to rotate at least said one bar,
means associately conjoined to and adapted to further separate said bars so as to allow said egg to fall therebetween,
and means disposed below and adjacent said parallel bars for pivoting said egg into a point-down disposition as it falls from between said parallel bars,
said egg being discharged from between said parallel bars offset toward its pointed end upon said means disposed below said parallel bars.

13. The structure defined in claim 12, and in which the other of said parallel bars is fixedly secured against rotation and is provided with portions at each end thereof extending upwardly as ramps from a medial portion toward each end of said other bar,
whereby each said egg on said two parallel bars is caused to advance substantially in the direction of its point until said egg engages an edge of one of said ramps and its advance is halted.

14. The structure defined in claim 12, and in which said device is provided with
complementary trough members disposed in substantially face to face relationship at each side of and below said means disposed below said parallel bars to receive said point-down egg as it pivots from said latter means.

15. The structure defined in claim 14, and in which said complementary trough members are pivotally secured for swinging their lower ends toward and away from each other,
whereby when said trough member lower ends are disposed toward each other said point-down egg is suspended therebetween and when said lower ends are pivoted away from each other said point-down egg is discharged into a receiving container therebelow.

16. In a device for end aligning eggs in a point-down disposition,
end aligning mechanism having
two parallel spaced apart bars adapted to receive and support a plurality of eggs in spaced relationship thereon and therebetween,
at least one of said bars being rotatable and in frictional engagement with said eggs to rotate and to advance said eggs substantially in the directions of their points upon said parallel bars,
means to rotate at least said one bar,
means associately conjoined to and adapted to further separate said parallel bars so as to allow said eggs to fall therebetween,
and a plurality of means disposed below and adjacent said parallel bars for pivoting each of said eggs into a point-down disposition as it falls from between said parallel bars,
each of said eggs being discharged from between said parallel bars offset toward its pointed end upon each said means disposed below said parallel bars.

17. The structure defined in claim 16, and in which the other of said parallel bars is fixedly secured against rotation and is provided with a plurality of paired ramps inclined longitudinally and upwardly away from longitudinally spaced medial portions supporting said eggs together with said one bar,
whereby each said egg disposed upon said rotatable bar and each said medial portion is caused to advance substantially in the direction of its point toward one or the other of said ramps adjacent each said medial portion until each said egg engages an edge of one of said ramps and its advance is halted.

18. The structure defined in claim 16, and in which said device is provided with
complementary trough members disposed in substantially face to face relationship at each side of and below each of said means disposed below said parallel bars to receive said point-down eggs as they pivot from said latter means.

19. The structure defined in claim 18, and in which said complementary trough members are pivotally secured for swinging their lower ends toward and away from each other,
whereby when said trough member lower ends are disposed toward each other said point-down eggs are each suspended therebetween and when said lower ends are pivoted away from each other said point-down eggs are each discharged into a recess in a receiving container.

References Cited in the file of this patent
UNITED STATES PATENTS

| | | |
|---|---|---|
| 2,895,274 | Mumma | July 21, 1959 |
| 2,895,589 | Rostron | July 21, 1959 |
| 3,024,889 | Reading | Mar. 13, 1962 |

FOREIGN PATENTS

| | | |
|---|---|---|
| 87,378 | Denmark | June 1, 1959 |